No. 700,513. Patented May 20, 1902.
J. P. LANGE.
ROLL.
(Application filed June 24, 1901.)
(No Model.)
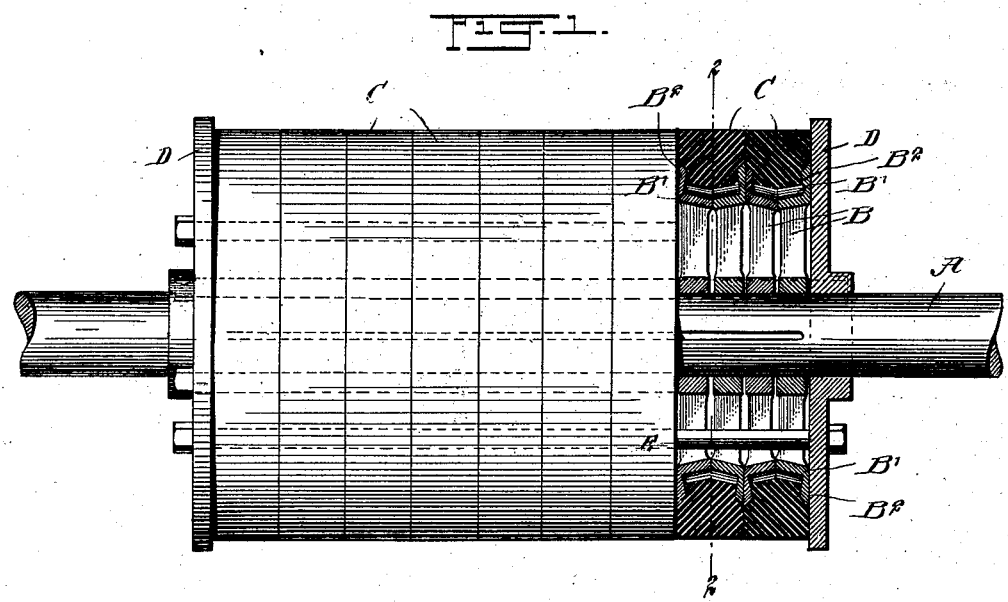
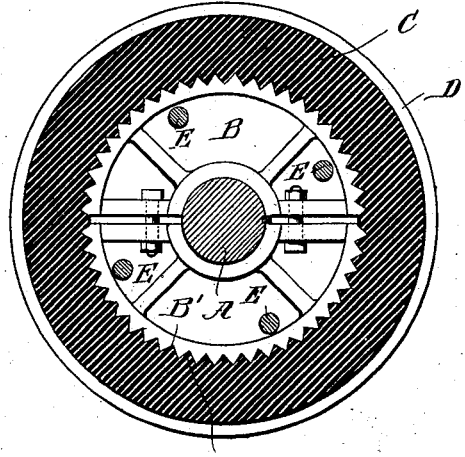 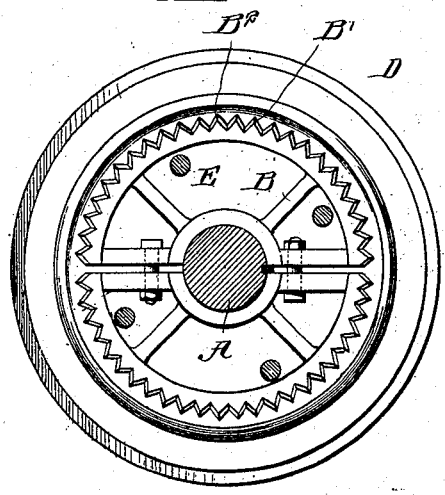
WITNESSES:
INVENTOR
Jurgen P. Lange
BY
ATTORNEYS

UNITED STATES PATENT OFFICE.

JURGEN PETER LANGE, OF PASSAIC, NEW JERSEY.

ROLL.

SPECIFICATION forming part of Letters Patent No. 700,513, dated May 20, 1902.

Application filed June 24, 1901. Serial No. 65,835. (No model.)

*To all whom it may concern:*

Be it known that I, JURGEN PETER LANGE, a citizen of the United States, and a resident of Passaic, in the county of Passaic and State of New Jersey, have invented a new and Improved Roll, of which the following is a full, clear, and exact description.

The invention relates to wringing and other machines using rubber rolls; and its object is to provide a new and improved roll arranged to hold the rubber faces against separate movement or stretching and to permit of conveniently assembling the several parts constituting the roll.

The invention consists of novel features and parts and combinations of the same, as will be fully described hereinafter and then pointed out in the claim.

A practical embodiment of the invention is represented in the accompanying drawings, forming a part of this specification, in which similar characters of reference indicate corresponding parts in all the views.

Figure 1 is a side elevation of the improvement with parts in section. Fig. 2 is a transverse section of the same on the line 2 2 of Fig. 1; and Fig. 3 is a somewhat-similar section, but taken on a line adjacent to one of the heads.

On the shaft A are keyed or otherwise secured the hubs of sets of wheels B, each set carrying a rubber ring C on its peripheral face. The wheels B and rings C are held against longitudinal movement on the shaft A by heads D, fastened together by longitudinal bolts E, extending through the open hubs of the wheels B, as will be readily undestood by reference to the drawings, the bolts when screwing up the nuts thereon serving to draw the heads sufficiently tight against the outermost wheels and rings to securely clamp all of the parts together.

Each set of wheels B consists of two wheels made in sections fastened together by bolts or other means, as is plainly indicated in Figs. 2 and 3, and each wheel is provided on its peripheral face with teeth B', preferably made V-shaped and somewhat inclined transversely, as is plainly indicated in Fig. 1, and the inner sides of the rings C are correspondingly toothed or serrated to fit the teeth B' of a set of wheels to hold the rubber rings C against movement independent of the rotation given to the roll on rotating the shaft A and the wheels B.

The two wheels of a set of wheels B are formed with flanges $B^2$, so as to engage the sides of a ring a short distance from the inside toward the outside, as indicated in Fig. 1. Thus the outer portions of the rubber rings C are in firm contact with each other and are completely unobstructed to permit the rings to possess the elasticity and flexibility necessary in the machines for which the rolls are intended.

It will thus be observed that my device comprises, in effect, a number of semicircular sections placed together edge to edge so as to form wheel members, endless bands of resilient material encircling these wheel members in such manner as to hold them together and also to hold together the oppositely-disposed semicircular sections in each wheel member, longitudinal rods running entirely through the roll, and short bolts securing together the semicircular sections of each of the wheel members. By this arrangement the resilient bands coact with the short bolts in holding together pairs of semicircular members and also coact with the long rods in holding the several wheel members together in a continuous cylinder.

Having thus fully described my invention, I claim as new and desire to secure by Letters Patent—

A roll, comprising semicircular sections placed together edge to edge so as to form wheel members, endless bands of resilient material encircling said wheel members in such manner as to secure a plurality of said wheel members together and also to press together the semicircular sections in each wheel member, bolts disposed substantially at right angles to the axes of said wheel members for further securing together the semicircular sections of each wheel member, and logitudinal rods passing through all of said wheel members parallel with the axes thereof for the purpose of clamping said wheel members together.

In testimony whereof I have signed my name to this specification in the presence of two subscribing witnesses.

JURGEN PETER LANGE.

Witnesses:
  CHAS. J. HENSER,
  THEO. CAYAN.